United States Patent [19]

Allaire

[11] Patent Number: 4,976,761
[45] Date of Patent: Dec. 11, 1990

[54] METHOD FOR MAKING CERAMIC MATRIX COMPOSITE ARTICLE

[75] Inventor: Roger A. Allaire, Big Flats, N.Y.

[73] Assignee: Corning, Incorporated, Corning, N.Y.

[21] Appl. No.: 389,674

[22] Filed: Aug. 4, 1989

[51] Int. Cl.$^5$ ..................... C03B 37/023; C03C 25/02
[52] U.S. Cl. ............................................ 65/3.2; 65/2;
65/18.1; 65/18.4; 65/60.5; 156/89; 427/376.2;
427/434.6
[58] Field of Search .................. 65/2, 18.1, 60.5, 60.8,
65/18.4, 3.2; 427/376.2, 434.6; 156/89

[56] References Cited

U.S. PATENT DOCUMENTS

| | | | |
|---|---|---|---|
| 4,314,852 | 2/1982 | Brennan et al. | 501/88 |
| 4,464,475 | 8/1984 | Beall et al. | 501/9 |
| 4,511,663 | 4/1985 | Taylor | 501/4 |
| 4,554,197 | 11/1985 | Chyung et al. | 428/113 |
| 4,615,987 | 10/1986 | Chyung et al. | 501/8 |
| 4,626,515 | 12/1986 | Chyung et al. | 501/32 |
| 4,752,313 | 6/1988 | Allaire et al. | 65/18.1 |
| 4,755,489 | 7/1988 | Chyung et al. | 501/8 |

FOREIGN PATENT DOCUMENTS 2210038A 6/1989 United Kingdom .

Primary Examiner—Robert L. Lindsay
Attorney, Agent, or Firm—Kees van der Sterre

[57] ABSTRACT

A method for making a fiber-reinforced ceramic matrix composite article is disclosed wherein a ceramic matrix material in the form of a glass powder is combined with a fibrous reinforcing material such as a fiber tow, and the powder and tow are transported into a hot zone wherein they are consolidated together by winding under tension onto a collection mandrel at a temperature above the annealing temperature of the glass. High density composites are provided without the use of subsequent high pressure consolidation treatments.

6 Claims, 1 Drawing Sheet

METHOD FOR MAKING CERAMIC MATRIX COMPOSITE ARTICLE

BACKGROUND OF THE INVENTION

The present invention relates generally to the manufacture of ceramic matrix composite articles, and more particularly to an improved method for manufacturing a composite article comprising a glass or glass-ceramic matrix within which is provided a reinforcing phase consisting of carbon or other inorganic fibers.

Composites comprising a matrix of glass and a reinforcing phase composed of refractory inorganic whiskers or fibers are well known. U.S. Pat. No. 4,314,852, for example, discloses glass products wherein reinforcing silicon carbide fibers are included to increase the fracture toughness and/or flexural strength of the product. U.S. Pat. No. 4,511,663 discloses fiber reinforced products wherein graphite fibers coated with a metal constitute the fiber reinforcement, while U.S. Pat. No. 4,626,515 describes a family of composites wherein reinforcement is by a combination of silicon carbide fibers and silicon carbide whiskers.

In conventional practice, composites such as disclosed in the prior art are fabricated by combining a yarn or tow of the fiber selected for reinforcement with a ceramic powder consisting of the matrix material to be used. To combine the yarn with the powdered matrix, a slurry of the matrix powder is prepared and the yarn is then coated with this slurry by passing a continuous strand of the yarn through the slurry. The slurry immersion thoroughly coats and impregnates the yarn with the powdered matrix.

The coated yarn thus produced is then collected, on a rotating drum or other support, to form a continuous layer or sheet, termed a prepreg. After drying, this sheet is typically cut into green prepreg mats comprising the fibers, typically in more or less uniaxial orientation, and intimately coated with the matrix powder mixture.

To provide a consolidated ceramic matrix composite product from prepreg mats produced as described, the mats or sections cut therefrom are stacked to a desired thickness and are then consolidated by the application of heat and pressure. The product of this hot pressing step is typically a dense composite article substantially free of voids and defects and exhibiting a strength and toughness substantially in excess of the matrix material alone.

As will be appreciated, the process of hot pressing adds considerable time and expense to the composite manufacturing process. Hot pressing cannot be carried out as a continuous process, and in addition is largely limited in its application to the consolidation of preforms of flat or relatively simple configuration.

Another problem related to the conventional processing of ceramic matrix composites as above described stems from the relatively low density of the composite prepreg material. Thus substantial debulking of the prepreg must normally take place before useful consolidation of the glass and fiber components can take place. For example, prepregs produced by slurry treatment of fiber tows as above described will typically have a density which is only about 30% of the final target density of the material. Thus a substantial volume reduction in the prepreg is required in the hot pressing step before the final density of the finished product can be reached.

A number of suggestions for debulking composite prepregs prior to final consolidation have been made. These include preliminary cold pressing of the prepregs, pultrusion of the impregnated yarn at ambient or elevated temperatures, and similar compacting procedures. However, these approaches again add processing steps and expense, and in many cases fail to achieve a useful level of debulking or provide prepreg sheet or yarn which is inflexible and relatively difficult to handle.

Accordingly, it is a principal object of the present invention to provide a process for ceramic matrix composite matrix manufacture which more economically provides high density ceramic matrix composite preforms or products.

It is a further object of the invention to provide a process for the fabrication of curved cylindrical or other hollow ceramic composite bodies wherein the necessity for hot pressing to reach a useful level of composite density is avoided.

Other objects and advantages of the invention will become apparent from the following description thereof.

SUMMARY OF THE INVENTION

The present invention provides an improved method for the manufacture of a fiber-reinforced composite article wherein substantial densification of the composite is achieved as the composite is first formed. This is achieved by a hot winding process wherein layup of the composite is carried out while the prepregged fiber or fiber yarn or tow is heated to soften the matrix glass.

Broadly characterized, the invention includes the following fundamental steps. First, a ceramic matrix material for the composite is selected, this material being provided in the form of a glass powder. Generally, though not necessarily, the powder will be utilized in the form of a flowable suspension of the glass powder in a suitable vehicle.

A fibrous reinforcing material is next selected for inclusion in the composite, this material being provided as a single fiber, or more preferably a multiplicity of fibers, forming a continuous fiber strand. Typically, the continuous fiber strand will comprise a multifilament fiber tow, yarn or woven tape.

The fibrous reinforcing material is next combined with the ceramic matrix powder by adhering the powder to the continuous fiber strand. This may be accomplished in any suitable manner, but in conventional practice simply involves transporting the continuous fiber strand through a flowable suspension of the glass powder so the the glass coats and or impregnates the strand. Also in conventional practice, drying and/or debindering steps may be used to remove volatile or decomposable solvent or binder materials from the fiber and adherent glass, if present, prior to further processing.

The fiber strand with adherent powdered glass is next continuously fed into a hot zone provided by a furnace or other suitable means wherein the glass powder adhering to the fiber strand is heated to a temperature at least above the annealing temperature of the glass. After the strand has been heated, and while maintaining the strand temperature above the glass powder annealing point, the heated fiber strand and glass are collected by winding onto collection means such as a rotating collection mandrel.

During the collection of the heated fiber, tension is also applied to the fiber in order to generate pressure between the fiber and the underlying surface of the collection means. This pressure, acting in a direction normal to the collection surface, provides a consolidation force on the powdered glass on and within the fiber strand.

As a further consequence of the pressure generated by collecting the fiber and heated glass powder under tension on the collection mandrel, the collected fiber with adhering hot glass is also caused to fuse with and consolidate adjacent and underlying glass-coated fibers on the mandrel. The product resulting from this hot winding procedure is thus a composite layup of the fibers and glass which is much closer to the theoretical density of the glass/fiber system being processed than is a conventional composite prepreg.

In many cases the composite product produced as above described is sufficiently dense that further consolidation prior to use is not required. In other cases, further processing of the product, either to achieve additional densification of the composite or to convert the fused glass matrix to a crystalline glass-ceramic matrix, may be carried out. In all instances, however, little or no debulking of the composite is necessary in order to achieve a satisfactory level of density in the final product, and cylindrical or other hollow fiber reinforced ceramic matrix composites may be conveniently provided.

DESCRIPTION OF THE DRAWING

The invention may be further understood by reference to the drawing, wherein.

DETAILED DESCRIPTION

As will become evident from the following description, the invention is applicable in principle to the fabrication of ceramic matrix composite products employing a variety of inorganic reinforcing fibers and ceramic matrix materials. Thus, for example, whereas graphite fibers constitute the presently preferred fibers for use in the present process, from the standpoint of attaining high consolidation pressures, other well known fiber reinforcement materials having known utility for the fabrication of ceramic matrix composite products may alternatively be used.

Examples of alternative fiber materials which are known for use in composite applications include silicon carbide or silicon oxycarbide fibers as well as fibers of alumina, B4C, BN, zircon, mullite, spinel or silicon nitride. The principal variable governing ease of use in the present process is the hot strength of the fibers selected. Thus fiber materials exhibiting high inherent strength at temperatures in the softening range for the selected matrix material can be wound at higher tension, and will thus generally provide more highly consolidated products.

The composition of the ceramic matrix material to be employed for composite manufacture is likewise not critical to the process. Silicate glasses, and particularly borosilicate glasses, are the materials presently preferred for the fabrication of graphite fiber-reinforced products, but other glass or glass-ceramic materials having known utility for the manufacture of ceramic matrix composite articles may instead be used.

Examples of other ceramic materials known to be suitable for ceramic composite manufacture include refractory alkaline earth aluminosilicate glass-ceramics such as disclosed, for example, in U.S. Pat. Nos. 4,615,987, 4,755,489 and 4,464,475. Also useful are lithium or zinc aluminosilicate glass-ceramics such as described in U.S. Pat. No. 4,554,197. Glasses which may be utilized to provide amorphous or noncrystalline matrices in these composites include alkali-free alkaline earth aluminosilicate glasses substantially free of alkali metal oxides, as well as the alkali borosilicate or boroaluminosilicate glasses more particularly hereinafter described.

Figure 1:
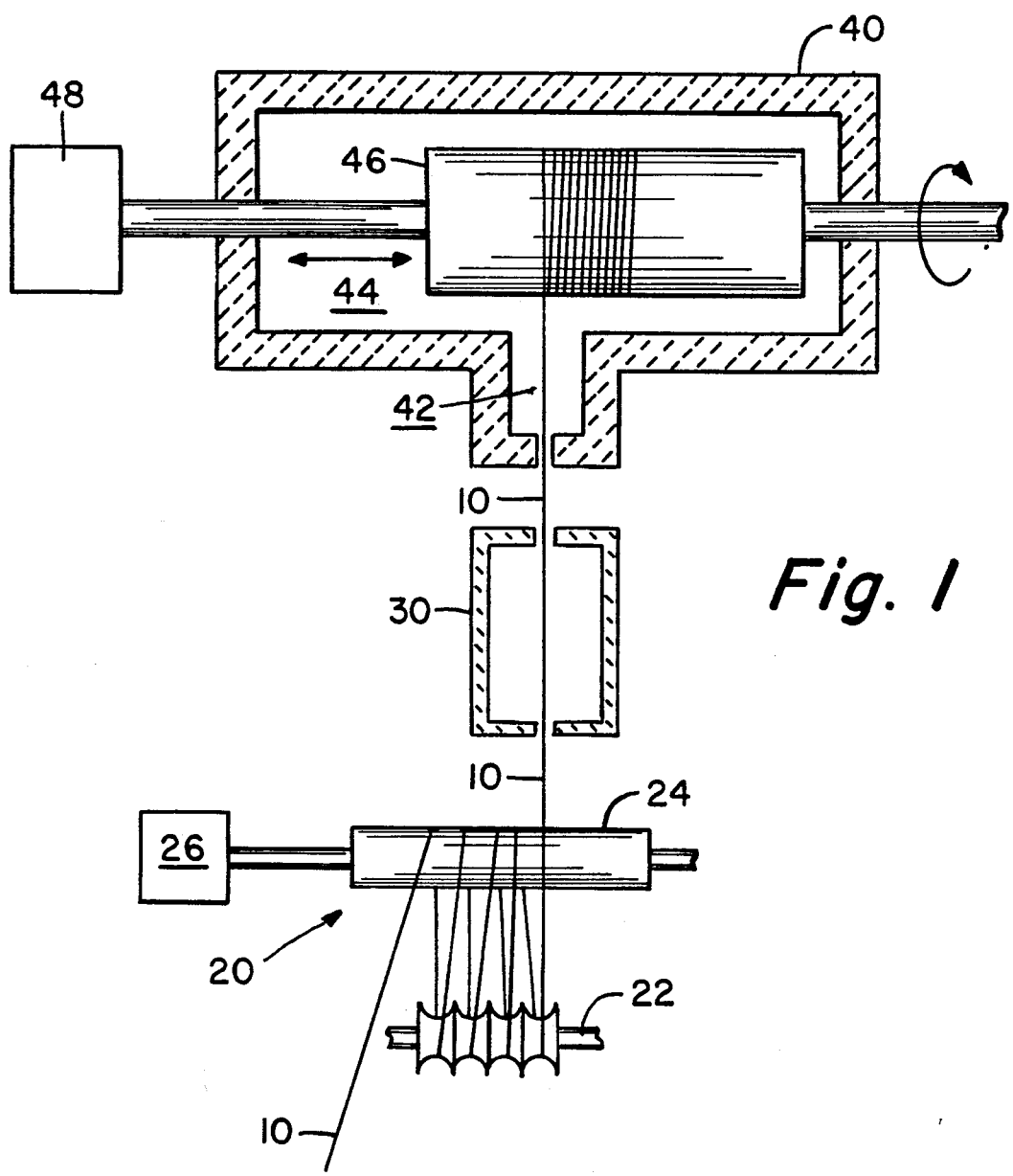
FIG. 1 is a schematic plan view of apparatus suitable for providing ceramic matrix composites in accordance with the invention.

Apparatus suitable for the manufacture of a fiber-reinforced composite in accordance with the invention may be of any design suitable for carrying out a hot fiber winding process at a temperature above the annealing point, or more preferably above the softening point, of the selected matrix glass. One example of such apparatus is schematically illustrated in FIG. 1 of the drawing. FIG. 1 consists of a plan schematic view, not in true proportion or to scale, of hot winding apparatus wherein good compaction of prepregged fiber strands can be achieved at relatively rapid winding rates.

Referring more particularly to FIG. 1, a prepregged fiber strand 10 with adherent powdered glass integrated into the fiber is fed through tensioning system 20 for controlling the feed rate and thus the tension on the strand. Tensioning system 20 comprises guide pulleys 22 and friction roller 24, the rotation rate of the friction roller being controlled by drive motor 26 in order to control the feed rate and therefore the tension on the fiber strand as it is feed into the apparatus.

After passing through tensioning system 20 the prepregged fiber strand enters burnout furnace 30. Furnace 30 is actuated whenever the fiber strand to be processed comprises vaporizable solvent or binder constituents which must be burned out of the glass/fiber combination before it can be satisfactorily consolidated. In such cases, furnace 30 is maintained at a temperature above the vaporization temperature of the binders or other constituents present, and the dwell time of the fiber in the furnace is adjusted so that all such constituents are vaporized prior to the time that the fiber and adherent glass powder exit the furnace.

After exiting the burnout furnace the fiber strand with adherent glass is transported into hot winding furnace 40 wherein it is heated to a temperature sufficient to soften the glass. The winding furnace includes preheat zone 42 and fiber collection zone 44, the preheat zone being used to preheat the fiber strand with adherent glass before it enters the collection zone.

After entering collection zone 44, fiber strand 10 with adherent glass is collected while still at an elevated temperature by the rotation of collection mandrel 46. In the apparatus shown, the mandrel is maintained at substantially the same temperature as the furnace interior, such that no cooling of the strand occurs during the collection process.

Collection mandrel 46 is driven at a suitable and normally fixed takeup rate by drive motor 48. During collection, the tension on fiber strand 10 is monitored and controlled by controlling the rotation rate of friction roller 24 in the tensioning system. In this way, steady tension at any arbitrarily selected level may be continuously applied to the length of fiber strand between collection mandrel and the friction roller, to control strand pressure applied to the mandrel.

As indicated by opposing arrows in the winding furnace, provision is desirably made to permit reciprocating translational movement of mandrel 46 with drive motor 48 in a direction parallel with the axis of rotation of collection mandrel 46 within the winding furnace. This reciprocal motion capability provides a convenient method for facilitating the collection of the hot fiber strand in spiral layers on the mandrel.

Of course, numerous variations on the apparatus set forth in the drawing may be employed to vary the results achieved in accordance with the process. For example, in order to minimize cooling of the fiber strand between the burnout furnace and the hot winding furnace, an insulated conduit may be provided between the furnaces. In addition, tensioning means such as a contacting pair of friction rollers could be substituted for the more complex system of pulleys and single friction roller shown in the drawing. Of course there is no requirement that the mandrel utilized for hot winding be purely cylindrical. More generally, any axisymmetric tool, or even tooling which is not symmetrical about the winding axis, could be used provided that adequate tension-generated consolidation pressure at the strand collection point can be developed.

As will be appreciated, the consolidation pressure developed at the collection point for the hot fiber strand on the mandrel largely governs the extent of consolidation of the material at that point. The magnitude of this pressure is found to depend on a number of factors in addition to the tension applied to the fiber being collected. A theoretical relationship from which the applied consolidation pressure may be derived is given by the following equation:

$$P = \frac{2 P_1}{b D}$$

wherein
P = strand pressure directed normally to the mandrel surface at the strand/mandrel contact point;
$P_1$ = tensional force on the fiber strand;
b = width of the fiber strand at the contact point; and
D = diameter of the mandrel.

Figure 2:
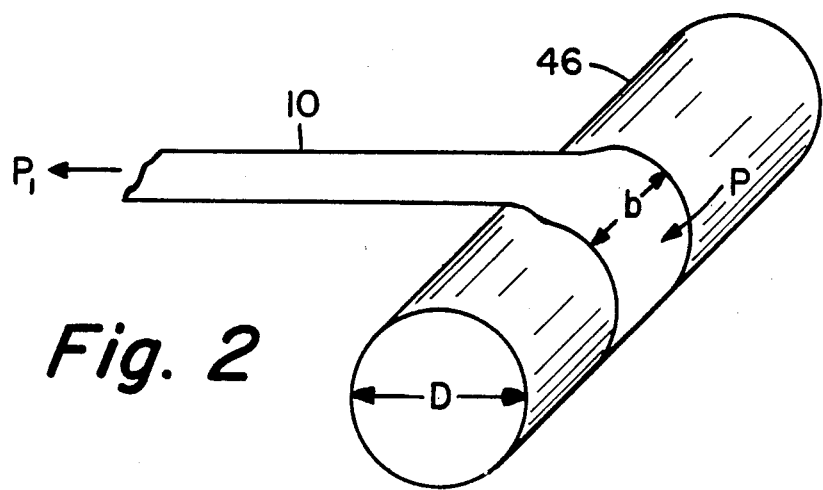
FIG. 2 is a schematic illustration of consolidation process variables applicable to the process of the invention.

FIG. 2 of the drawing schematically illustrates these variables and the mechanical components involved in the generation of consolidation pressure during the process. As shown in FIG. 2, the application of a tensional force $P_1$ to a fiber strand 10 being wound onto mandrel 46 develops a pressure P at the strand/mandrel contact point which is normal to the mandrel surface.

As the above equation indicates, the magnitude of the pressure P depends not only on the applied tension, but also on the diameter D of the mandrel and the width b of the fiber strand in the mandrel contact region. As a complicating factor, the value of b is generally not fixed but varies with the amount of strand deformation at the mandrel contact point. Thus b depends on factors such as the deformability of the glass-impregnated strand and the tension applied thereto. For these reasons, where a readily deformable, high-filament count yarn constitutes the fiber strand, physical measurement of the strand width b at the point of mandrel contact may constitute the best method to determine the value of this parameter.

For the purposes of the following description, tensional forces applied to the various fiber strands are reported in terms of the resulting tensional stress developed in the strands, in thousands of pounds per square inch (ksi), rather than in pounds of force applied to the strands. However, the reported stress values are based on computations from the actual force applied to the strands during the collection runs and the sum of the crosssectional areas of the fibers present in the particular strand being collected.

While the calculation of the exact consolidation pressure to be expected under a specified set of winding conditions may be of theoretical interest, such calculations are as a practical matter seldom required. This is particularly true since, as will be shown in the following examples, consolidation pressure alone is not the sole determinant of the final density of the products of the present process.

The invention may be further understood from the following detailed examples illustrating the manufacture of fiber-reinforced glass matrix composites in accordance therewith.

EXAMPLE

A fiber reinforcement material consisting of a continuous graphite fiber tow is first selected for incorporation into a composite product. The graphite tow selected is commercially available as AS4 fiber tow from Hercules Incorporated of Wilmington, Del., and has a fiber count of approximately 6,000 fibers in a typical cross-section of the tow diameter.

A glass is next selected for use as the matrix for the composite, that glass being an alkali borosilicate glass having an approximate composition, in weight percent, of about 65% $SiO_2$, 23% $B_2O_3$, 7% $Na_2O$ and 5% $Al_2O_3$. This glass is commercially available as Code 8830 glass from Corning Incorporated, Corning, N.Y., and has an annealing point temperature of approximately 500° C. and a softening point temperature of approximately 708° C.

In a preliminary step, the selected fiber tow is impregnated with the powdered glass to form a prepregged tow. This is accomplished in conventional fashion by transporting the tow through a slurry comprising the powdered glass in a liquid vehicle. The vehicle typically consists of an alcohol/water mixture containing a polyvinyl acrylate binder, the powdered glass normally constituting about 27% by weight of the slurry. The fiber impregnated with the slurry is dried and the resulting prepregged fiber tow is thereafter collected on a transport reel.

In preparation for hot winding, the free end of the prepregged fiber tow is fed through apparatus such as shown in FIG. 1 of the drawing, being first wrapped on the tensioning system and fed through the burnout furnace. The free end is then tied around the collection mandrel within the winding furnace.

In the specific winding system employed, the collection mandrel has a diameter of about 2 inches and, to aid in the subsequent release of the consolidated composite winding, is first covered with layers of graphite foil and an overlayer of molybdenum foil sprayed with graphite. Several turns of the free fiber end around this covering are made to secure it to the mandrel.

After the tow end has been secured to the collection mandrel, the furnace is closed and purged with nitrogen, and both the preheat and winding zones in the winding furnace are heated to an operating temperature of approximately 800° C. At the same time, the burnout furnace is started and heated to approximately 500° C. After these operating temperatures have been reached, mandrel rotation and translation is commenced to begin collection of the fiber strand with softened hot glass.

Collection of the heated glass-impregnated fiber tow on the collection mandrel is carried out at a fiber transport speed of about 7 in/min. During the collection procedure a tension of approximately 15 ksi is maintained on the hot fiber tow by controlling the rate of prepreg fiber payout from the tensioning system.

The winding pitch on the mandrel during the collection interval is approximately 0.125 inches. This pitch is sufficiently low such that an essentially continuous single layer winding about 10 inches in length is collected with each traverse of the mandrel. Three passes across the mandrel are made to collect three successive single layers, so that a wound tube comprising three wound fiber layers is provided.

At the completion of the collection process the winding furnace is allowed to cool at the furnace rate, with continuing flow of nitrogen purge gas, until the furnace reaches approximately 200° C. The furnace then is opened and the wound consolidated composite tube is removed from the mandrel and examined.

Inspection of the glass/graphite tube produced as described indicates that a high degree of consolidation during the hot winding process has been achieved. Despite the appearance of slight surface bubbling on the outer surface of the tubing, the tube wall has a density of approximately 1.955 gm/cc. This compares favorably with the maximum theoretical density of about 2.0 gm/cc for the specific proportions of graphite fiber and borosilicate glass making up the tube wall. Thus the tube provided can be used without further consolidation for many applications not requiring 100% densification of the composite system.

The product densities attainable in accordance with the process described in the foregoing example are considered to depend not only upon variables directly affecting strand pressure at the collection point, such as the applied tension and the size of the fiber strand, but also upon other variables such as winding temperature, winding speed, glass content, strand type and glass type. Accordingly, density variations can be observed even among products wound at the same temperatures.

Table I below sets forth data for additional composite fabrication runs generally following the procedure of Example 1 above, but wherein different hot winding conditions and fiber tow materials are employed. Included in Table I for each of a number of such runs are an identification number (Run ID), which is applied based on the fiber type, fiber tension and winding temperature used each the run. Also reported is the number of runs for the indicated Run ID.

For each of the runs reported, the type of fiber tow employed is recorded by a letter code designation of A, B, or C. The fiber type designated A refers to Hercules AU-4 graphite fiber tow, that tow having a fiber count of approximately 12,000 fibers in a typical tow cross-section. Fiber types B and C are Hercules AS-4 fiber tows, with fiber counts of 6,000 and 3,000, respectively, in a typical tow cross-section.

Also reported in Table I are the tension applied to the fiber prepreg strand during winding (in ksi), the temperature in the winding and preheat zones of the furnace during winding, and an average density value for the products produced under the indicated Run ID. As in Example 1, all of the runs are conducted at a fiber transport speed of 7 in/min and all products consist of three single-ply layers of wound fiber.

TABLE I

| Run ID | No. Runs | Fiber Type | Winding Tension (Ksi) | Winding Temp. (°C.) | Average Composite Density (gm/cc) |
| --- | --- | --- | --- | --- | --- |
| 1 | (1) | A | 5.0 | 1000 | 1.671 |
| 2 | (2) | A | 7.7 | 800 | 1.799 |
| 3 | (2) | B | 15.0 | 800 | 1.920 |
| 4 | (1) | B | 4.4 | 700 | 1.872 |
| 5 | (1) | C | 9.1 | 800 | 1.899 |
| 6 | (1) | C | 20.0 | 800 | 1.884 |

As is evident from the data reported in Table I, a relatively wide range of product densities may be achieved in accordance with the invention, depending upon variables such as fiber tow size, winding tension and winding temperature. However, no strict correlation between product density and the winding tension or temperature employed has been identified. Thus the optimum combination of winding speed, winding temperature, winding tension, fiber size, fiber loading and other variables for the production of a specific product are best determined by routine experiment depending upon the requirements for the particular product end use.

As will be appreciated, the composite products produced as above described exhibit a relatively high winding angle (the angle between the wound fibers and rotation angle of the mandrel), due to the relatively low pitch of the fiber windings provided. For some applications, as where cylindrical tubing with a higher ratio of axial strength to hoop strength is desired, winding angles in the range of 45 to 60 degrees will normally be provided.

Higher effective winding angles may be achieved either by winding at a higher pitch length, or by including within the composite structure one or more underlying or interleaved layers of prepreg material incorporating fibers having a larger directional component parallel with the mandrel axis. Excellent consolidation of such underlying or interleaved prepreg layers may be achieved simply by overwinding such layers at elevated temperatures with fiber strands incorporating adherent softened glass in accordance with the invention as above described.

In an illustrative procedure, a glass-coated underlayment or prepreg comprising at least some fibers which are disposed at low angles compared to the winding angle, for example at angles in the range of 0–75° from the axis of example rotation of the mandrel, is provided on the mandrel at the commencement or in the course of the winding process. This underlayment is positioned for direct overwinding by the continuous fiber strand and adherent hot glass and, due to the pressure of the overwound fiber and preferably an elevated temperature in the winding zone, the underlayment with low-angle fibers is conveniently incorporated into the wound structure.

One limitation upon the applied pressure at the point of fiber collection in the hot winding process is that of the strength of the fiber material selected. The tension applied to the fiber strand will of course normally be maintained at a level below that at which the incidence of fiber breakage during processing becomes excessive. For graphite fibers of the kind utilized in the above examples, winding tensions below about 10 ksi are particularly preferred where fiber breakage during the winding process must be minimized.

As previously indicated, other types of fibers as well as other powdered glasses may be utilized in the fabrication of ceramic matrix composites in accordance with the procedures hereinabove described. However, changes in operating temperatures and winding tensions may be required in order to optimize the composite products produced. Thus, for example, certain commercially available silicon carbide fiber tows (e.g., Nicalon ® fiber tows) are relatively weak after the removal of sizing materials therefrom and were not successfully consolidated on a mandrel at the temperatures and winding tensions utilized for graphite fiber processing in accordance with the above examples. However, as the textile quality of commercially available inorganic fibers improves and/or as lower melting glasses may be employed for processing, successful hot winding of essentially any inorganic fiber material provided as a continuous strand will be routine.

Similarly, certain more refractory glasses, e.g., thermally crystallizable alkaline earth aluminosilicate glasses such conventionally utilized for the production of refractory glass-ceramic matrix composites, may exhibit higher softening temperatures and/or a tendency to crystallize prematurely if low winding temperatures are used. These glasses will be processed at higher temperatures and/or higher collection rates in order to produce well-bonded composite assemblies. Again, however, the best winding conditions to utilize with any particular combination of fibers and powdered glasses may be readily determined by routine experiment.

I claim:

1. A method for the manufacture of a composite article which comprises the steps of:
   providing a ceramic matrix material in the form of a glass powder;
   providing a fibrous reinforcing material comprising one or more inorganic fibers in the form of a continuous fiber strand;
   adhering the glass powder to the continuous fiber strand;
   transporting the continuous fiber strand with adherent glass power into a hot zone wherein the glass powder is heated to a temperature at least above the annealing temperature of the glass; and
   simultaneously collecting and consolidating the strand and adhering glass powder into a dense composite winding on a rotating collection mandrel, wherein the consolidation results solely from the action of a tensional force applied to the fiber strand in a direction opposite to the direction of collection of the fiber strand.

2. A method in accordance with claim 1 wherein the ceramic matrix material is a borosilicate glass.

3. A method in accordance with claim 2 wherein the fibrous reinforcement material includes graphite fibers.

4. A method in accordance with claim 3 wherein the fibrous reinforcement material is a continuous strand of a multifilament graphite yarn.

5. A method in accordance with claim 1 wherein the collection mandrel is maintained at a temperature above the annealing temperature of the glass.

6. A method in accordance with claim 1 wherein there is provided on the collection mandrel, for overwinding by the continuous fiber strand, a glass-coated fiber underlayment comprising fibers disposed at angles in the range of about 0–60° from the direction of the axis of rotation of the collection mandrel.

* * * * *